2,746,976
Patented May 22, 1956

2,746,976

PROCESS FOR THE PREPARATION OF ALKOXY-TETRAHYDROFURANES

Arthur Stoll, Arlesheim, Ernst Jucker, Binningen, and Adolf Lindenmann, Basel, Switzerland, assignors to Sandoz A. G., Basel, Switzerland, a Swiss firm No Drawing. Application June 21, 1954, Serial No. 438,331

Claims priority, application Switzerland June 24, 1953

6 Claims. (Cl. 260—347.8)

The present invention relates to a process for the preparation of 2,3,5-trialkoxy-tetrahydrofuranes of the formula

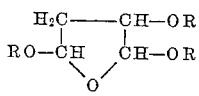

wherein R stands for $CH_3$, $-CH_2CH_3$, $-CH_2CH_2CH_3$ or $CH(CH_3)_2$.

Briefly stated, the process of the invention involves treating the appropriate compound of the formula

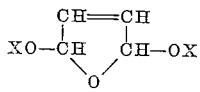

wherein X stands for $CH_3$, $-CH_2CH_3$, $-CH_2CH_2CH_3$, $-CH(CH_3)_2$ or $-COCH_3$, in an alkanol of the formula

R.OH wherein R has the afore-indicated significance, with hydrogen bromide or hydrogen chloride. The course of the reaction is indicated, for example, by the following scheme:

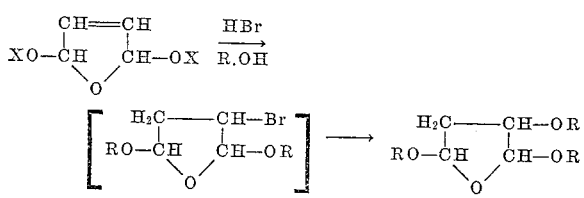

As the foregoing reaction scheme shows, the alkyl groups or acyl radicals located in the 2- and 5-positions of the starting compound are replaced by the alkyl group of the alkanol; thus, e. g., 2,3,5-trimethoxytetrahydrofurane is produced by the treatment of 2,5-diethoxy-dihydrofurane with hydrogen bromide in methanol.

In practice, the process is advantageously carried out, for example in the case of 2,3,5-trimethoxy-tetrahydrofurane, as follows:

The calculated quantity (1 mol) of hydrohalic acid, e. g. hydrobromic acid, is passed into a solution of 2,5-dimethoxy-dihydrofurane in methanol, while cooling. In a short time, the addition of the HBr elements to the 3,4-double bond and the replacement of the Br by the methoxy group are completed. The reaction mixture is freed of excess methanol, and the reaction product then extracted with an organic solvent, such for example as ether. The residue remaining upon the evaporation of the ether is distilled under reduced pressure.

The 2,3,5-trialkoxy-tetrahydrofuranes obtained in this way are water-white compounds which are liquid at room temperature (about 20 to about 30° C.) and which can be distilled without decomposition. They have a high solvent capacity for certain organic products and can therefore be used as specific solvents, e. g. in connection with hydrogenations. In this respect, the said compounds are similar to the long-known methylal. Furthermore, the 2,3,5-trialkoxy-tetrahydrofuranes are excellently suited for use as solvent in Grignard reactions which have to be carried out at relatively high temperature. The products of the invention are also useful as insecticides, more particularly against ants. To this end, use is advantageously made of solutions of the compounds in a hydrocarbon oil. The habitat of the ants may be painted or otherwise coated with the thus-produced "insecticide paint." Slow hydrolysis of the furane compound takes place, e. g. by the action of atmospheric moisture, with formation of the corresponding O-alkyl malic acid dialdehyde which is effective in controlling ants. The aforesaid insecticide paint is resistant to the action of rain and is long acting. The products of the invention also have a resin utility in that, following saponification to the corresponding dialdehydes, they may be condensed with e. g. urea to yield condensation products which are useful as plasticizers for cellulose resins.

The following examples represent illustrative embodiments of the invention. Parts are by weight unless otherwise indicated; parts by weight bear the same relation to parts by volume as do grams to milliliters. Temperatures are in degrees centigrade. Percentages are by weight.

Example 1

With the aid of a stream of nitrogen, the calculated quantity of hydrogen bromide is blown, at a temperature of $-5°$ to $+2°$, into a solution of 65 parts of 2,5-dimethoxy-2,5-dihydrofurane in 250 parts by volume of absolute methanol. After about 3 hours, the light brown colored solution is poured into 500 parts by volume of saturated aqueous calcium chloride solution, then extracted with 500 parts by volume of ether, and the ethereal extract shaken out with saturated aqueous sodium carbonate solution until no more liberation of $CO_2$ can be detected. The solution is dried over sodium sulfate, the ether is distilled off, and the residue is distilled under reduced presure. The product—2,3,5-trimethoxy-tetrahydrofurane—boils at 85° at a pressure of 15 mm. of mercury, and at 72–77° at a pressure of 10° mm. of mercury.

Example 2

While cooling, the calculated quantity of hydrogen bromide is blown, with the aid of a steam of nitrogen, into a solution of 13 parts of 2,5-dimethoxy-2,5-dihydrofurane in 50 parts by volume of absolute methanol. After about 3 hours, the solution is neutralized by the dropwise addition thereinto, while stirring, of the calculated quantity of sodium methylate (2.3 parts by weight of sodium in 20 parts by volume of methanol). Precipitated sodium bromide is filtered off, the filtrate is poured into 150 parts by volume of saturated aqueous calcium chloride solution and then extracted with a total of 200 parts by volume of ether. The ethereal extract is dried over sodium sulfate, the ether is evaporated off, and the residue distilled under reduced pressure. The product is 2,3,5-trimethoxy-tetrahydrofurane.

Example 3

The calculated quantity of hydrogen bromide is blown, with the aid of a stream of nitrogen and while cooling, into a solution of 79 parts of 2,5-diethoxy-dihydrofurane in 250 parts by volume of absolute methanol. After about 4 hours, the light brown colored reaction solution is poured into 500 parts by volume of a saturated aqueous calcium chloride solution, extracted with 500 parts by volume of ether, and the ethereal extract shaken out with saturated aqueous sodium carbonate solution until no more $CO_2$ evolution can be detected. The solution is dried over sodium sulfate, the ether evaporated off, and the residue distilled under reduced pressure. The product is 2,3,5-trimethoxy-tetrahydrofurane.

*Example 4*

With the aid of a stream of nitrogen and while cooling, the calculated quantity of hydrogen bromide is blown into a solution of 15.8 parts of 2,5-diethoxy-dihydrofurane in 50 parts by volume of absolute ethanol. After about 3 hours, the brown colored solution is poured into 150 parts by volume of saturated aqueous calcium chloride solution, extracted with 200 parts by volume of ether, and the extract shaken out with saturated aqueous sodium carbonate solution until no more $CO_2$ evolution can be detected. The solution is dried over sodium sulfate, the ether evaporated off, and the residue distilled under reduced pressure. The product is 2,3,5-triethoxy-tetrahydrofurane; boiling point 91–98° at a pressure of 15 mm. of mercury.

*Example 5*

The calculated quantity of hydrogen bromide is blown, with the aid of a stream of nitrogen and while cooling, into a solution of 15.8 parts of 2,5-diethoxy-dihydrofurane in 50 parts by volume of absolute ethanol. After about 3 hours, the solution is neutralized by the dropwise addition, while stirring of the calculated quantity of sodium ethylate (2.3 parts of sodium in 20 parts by volume of absolute ethanol). Precipitated sodium bromide is filtered off, the filtrate poured into 250 parts by volume of saturated aqueous calcium chloride solution and then extracted with a total of 200 parts by volume of ether. The ethereal extract is dried over sodium sulfate, the ether evaporated off, and the residue distilled under reduced pressure. The product is 2,3,5-triethoxy-tetrahydrofurane.

*Example 6*

The calculated quantity of hydrogen bromide is blown, with the aid of a stream of nitrogen and while cooling, into a solution of 15.8 parts of 2,5-diethoxy-dihydrofurane in 200 parts by volume of absolute isopropanol. After 5 hours, the deep brown solution is neutralized by the gradual addition of the calculated quantity of sodium isopropylate. The precipitated sodium bromide is filtered off, 200 parts by volume of ether admixed with the filtrate, the latter then shaken out with saturated aqueous sodium chloride solution, and drying effected over sodium sulfate. The ether and most of the excess isopropanol are evaporated under slightly reduced pressure, and the residue fractionated under reduced pressure. 2,3,5-triisopropoxy-tetrahydrofurane—boiling point 104–105° under a pressure of 14 mm. of mercury—is thus obtained.

*Example 7*

The calculated quantity of hydrogen bromide is blown, with the aid of a stream of nitrogen and while cooling, into a solution of 31.6 parts of 2,5-diethoxy-dihydrofurane in 100 parts by volume of absolute isopropanol. After 5 hours, the deep brown colored reaction solution is admixed with 100 parts by volume of ether, the mixture shaken out with 200 parts by volume of saturated aqueous sodium carbonate solution, drying effected over potassium carbonate, the ether and the greater portion of the isopropanol evaporated under slightly reduced pressure, and the residue vacuum distilled. The product is 2,3,5-triisopropoxy-tetrahydrofurane.

*Example 8*

Into a solution of 15.8 parts of 2,5-diethoxy-dihydrofurane in 200 parts by volume of n-propanol, the calculated quantity of hydrogen bromide is blown in with the aid of a stream of nitrogen, while cooling. After five hours, the deep brown solution is slowly neutralized by means of the calculated quantity of sodium propylate, while cooling. Precipitated sodium bromide is filtered off, 200 parts by volume of ether are added to the filtrate, the mixture shaken out with saturated aqueous sodium chloride solution, and drying effected with sodium sulfate. The ether is distilled off, and the residue is fractionated under reduced pressure. The product is 2,3,5-tripropoxy-tetrahydrofurane, boiling at 110–112° under a pressure of 12 mm. of mercury.

*Example 9*

The calculated quantity of hydrogen bromide is blown, with the aid of a stream of nitrogen and while cooling, into a solution of 31.6 parts of 2,5-diethoxy-dihydrofurane in 100 parts by volume of n-propanol. After 5 hours, the deep brown solution is admixed with 200 parts by volume of ether, shaken out with saturated aqueous sodium carbonate solution and dried over potassium carbonate. The ether is evaporated off, and the residue is distilled under reduced pressure. The product is 2,3,5-tripropoxy-tetrahydrofurane.

*Example 10*

6.5 parts of 2,5-diacetoxy-dihydrofurane are dissolved in 50 parts by volume of absolute 2% methanolic hydrochloric acid, and the reaction mixture is allowed to stand at 20° for one hour. Thereupon the solution is boiled for 3 hours under reflux, the methanol is distilled off, the residue is taken up in ether, the ethereal solution is shaken out with aqueous sodium bicarbonate solution, the ether distilled off, and the residue distilled under reduced pressure. At 13 mm. Hg, the thus-produced 2,3,5-trimethoxy-tetrahydrofurane at 70–72° distils over in practically quantitative yield.

*Example 11*

This example demonstrates the use of 2,3,5-trialkoxy-tetrahydrofuranes as solvents in Grignard reactions. Here the replacement of ether by a 2,3,5-trialkoxytetrahydrofurane is of advantage when the reaction must be carried out at a relatively high temperature or when the reaction product has a boiling point similar to that of ether, thus making separation more difficult. Both these conditions are fulfilled by the use of 2,3,5-trimethoxy-tetrahydrofurane in the preparation of n-pentane:

To 36 parts of magnesium chips are added 20 parts by volume of a solution of 225 parts of 2-bromopentane in 150 parts of 2,3,5-trimethoxy-tetrahydrofurane. As soon as the reaction commences and after the addition, with stirring, of 150 parts of 2,3,5-trimethoxy-tetrahydrofurane the rest of the solution is added at such a rate that the temperature reaches 50–60°. Then the mixture is warmed for one hour on the water bath. The solution of the Grignard compound is then added drop-wise to 1000 parts by volume of warm 5-N-sulfuric acid whereby the n-pentane is continuously distilled off and caught in an ice-cooled container. After addition of all of the Grignard solution the mixture is heated on a water bath until n-pentane no longer distills off. The n-pentane dried over potassium carbonate boils at 35.5–36.5° after double fractionation.

*Example 12*

This example demonstrates the use of 2,3,5-trialkoxy-tetrahydrofurane as a solvent during hydrogenation. It is known, for example, that the reduction of tropinone with sodium and alcohol yields chiefly ψ-tropine; the reduction in the presence of precious metal catalysts results in a mixture composed of tropine and ψ-tropine. However should tropinone in a solution of 2,3,5-trimethoxy-tetrahydrofurane be hydrogenated in the presence of Raney nickel a uniform tropine is obtained in theoretical yields:

2.0 parts of tropinone in 5 parts by volume of 2,3,5-trimethoxy-tetrahydrofurane are placed in an autoclave with 0.20 part of Raney nickel and hydrogenated for 5 hours at a temperature of 40–50° and a beginning pressure of 60 atmospheres. The hydrogenated mixture is taken up in 20 parts by volume of ether, filtered from the catalyst, ice-cooled and twice extracted with 50 parts by volume of 1-N-hydrochloric acid each time. Potassium carbonate is added to the combined aqueous layers until alkalinity is achieved and several extractions are then made using a total of 200 parts by volume of ether. The ether extracts evaporated and dried over potassium carbonate consist of tropine, which after distillation in vacuum display characteristics as described in the literature.

Having thus disclosed the invention, what is claimed is:

1. A process for the preparation of a 2,3,5-trialkoxy-tetrahydrofurane which corresponds to the formula

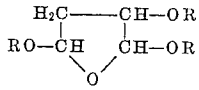

wherein R is a member selected from the group consisting of CH₃, —CH₂CH₃, —CH₂CH₂CH₃ and —CH(CH₃)₂, which comprises treating a compound of the formula

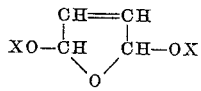

wherein X stands for a member selected from the group consisting of

CH₃, —CH₂CH₃, —CH₂CH₂CH₃, —CH(CH₃)₂ and —COCH₃, in an alcohol of the formula

R.OH wherein R has the aforesaid significance, with a member selected from the group consisting of hydrogen bromide and hydrogen chloride, while cooling and under anhydrous conditions.

2. A process for the preparation of 2,3,5-trimethoxy-tetrahydrofurane, which comprises treating 2,5-dimethoxy-2,5-dihydrofurane with hydrogen bromide in methanol, while cooling and under anhydrous conditions.

3. A process for the preparation of 2,3,5-trimethoxy-tetrahydrofurane, which comprises treating 2,5-diethoxy-2,5-dihydrofurane with hydrogen bromide in methanol, while cooling and under anhydrous conditions.

4. A process for the preparation of 2,3,5-triethoxy-tetrahydrofurane, which comprises treating 2,5-diethoxy-2,5-dihydrofurane with hydrogen bromide in ethanol, while cooling and under anhydrous conditions.

5. A process for the preparation of 2,3,5-triisopropoxy-tetrahydrofurane, which comprises treating 2,5-diethoxy-2,5-dihydrofurane with hydrogen bromide in isopropanol, while cooling and under anhydrous conditions.

6. A process for the preparation of 2,3,5-trimethoxy-tetrahydrofurane, which comprises treating 2,5-diacetoxy-2,5-dihydrofurane with hydrogen chloride in methanol, while cooling and under anhydrous conditions.

References Cited in the file of this patent

UNITED STATES PATENTS

| 2,475,097 | Jones | July 5, 1949 |
| 2,515,304 | Jones | July 18, 1950 |

OTHER REFERENCES

Clauson-Kass et al.: Acta Chem. Scand. 2, 109–115 (1948).
Fakstorp et al.: JACS 72, pp. 869–74 (1950).
Stoll et al.: Helv. Chim. Acta, 35, p. 1265 (1952).
Kebrle et al.: Helv. Chim. Acta, vol. 37 (1954), p. 486.